No. 656,003. Patented Aug. 14, 1900.
J. WEIDNER.
APPLIANCE FOR SECURING COVERS OF CULINARY VESSELS IN CLOSED POSITION.
(Application filed June 16, 1899.)
(No Model.)
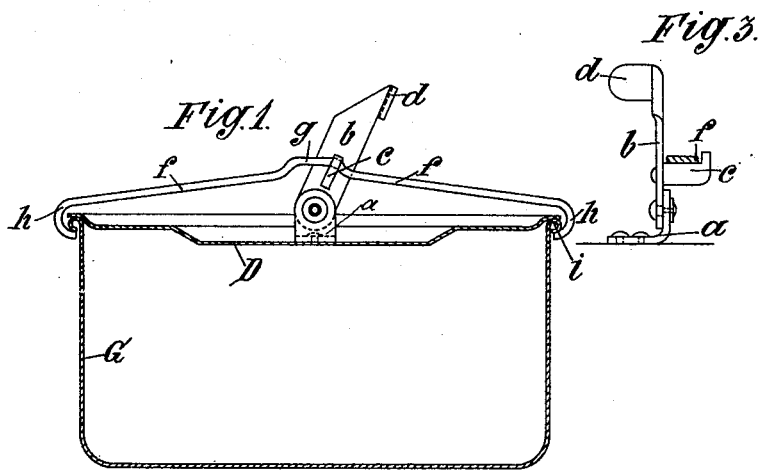
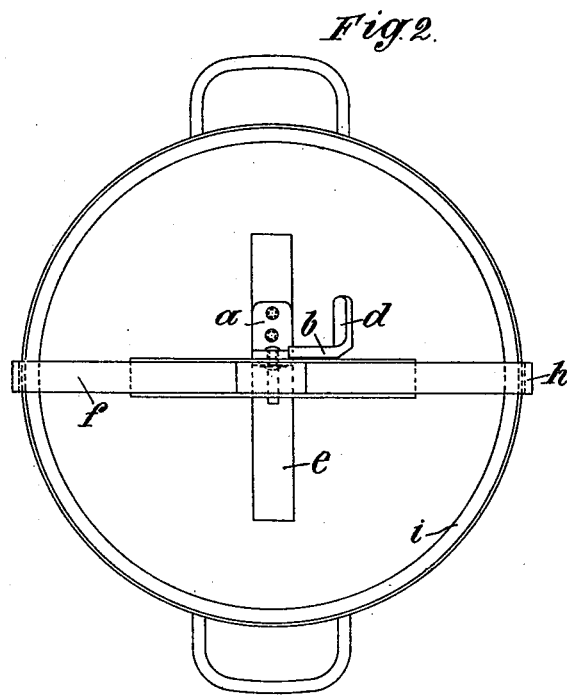
Witnesses.
Julius Lutz.
Isaac B. Owens.
Inventor:
Johann Weidner
By Munn
Attorneys.

United States Patent Office.

JOHANN WEIDNER, OF AMBERG, GERMANY, ASSIGNOR TO THE FIRM OF JOH. BAUMANN'S WWE., OF SAME PLACE.

APPLIANCE FOR SECURING COVERS OF CULINARY VESSELS IN CLOSED POSITION.

SPECIFICATION forming part of Letters Patent No. 656,003, dated August 14, 1900.

Application filed June 16, 1899. Serial No. 720,800. (No model.)

*To all whom it may concern:*

Be it known that I, JOHANN WEIDNER, a subject of the King of Bavaria, residing at Amberg, in the Kingdom of Bavaria, Germany, have invented certain new and useful Improvements in Appliances for Securing the Covers of Culinary Vessels in Closed Position, of which the following is a specification.

This invention relates to an appliance for securing the covers of culinary vessels, whether for boiling, steaming, or roasting, in closed position, which appliance is of a very simple construction and so arranged that it can be readily applied to any kind of culinary vessel that has a projecting rim at top.

The appliance is shown on the accompanying drawings, in which—

Figure 1 shows an elevation of the same as applied to a culinary vessel. Fig. 2 shows a plan, and Fig. 3 a detail in cross-section.

To the cover D of the saucepan G is riveted an angle-piece $a$, to which is pivoted a lever $b$, having a laterally-projecting finger $c$ and a suitably-formed handle $d$. For vessels of large diameter the cover can be strengthened by fixing under the angle-piece $a$ a strengthening-piece $e$. The cover D having been fitted on the vessel G, a bar $f$, with hook-shaped ends $h$, is slid laterally over the projecting rim $i$ of the vessel, so that the bar $f$ is situated over the finger $c$ of the lever $b$ when this is in the lowered position, the ends $h$ being engaged with the under side of the rim $i$. The lever $b$ is then turned upward, so that the finger $c$ enters the cranked middle part $g$ of the bar $f$ and in pressing against the under side thereof forces the lid D downward onto its seat. The cranking at $g$ of the bar $f$ has for its object to enable the pressure upon the lid to be regulated, so that if lever $b$ be brought into the upright position a strong downward pressure will be exerted on the lid, while if it bears in a more or less inclined position upon the sloping surface of the part $g$, as indicated at Fig. 1, the pressure upon the cover will be less. It is therefore possible by means of the said closing appliance to effect a greater or less steam-pressure within the vessel G, according as the lever $b$ is placed more or less vertical or inclined. When the lever $b$ is turned entirely down, the cover will be entirely relieved of pressure. When the food in the vessel is being cooked under strong pressure, the lever $b$ being vertical it is advisable before entirely freeing the cover so as to open it to bring the lever first in the inclined position, as at Fig. 1, so that the steam-pressure can to a certain extent diminish before the lever is turned quite down for opening the cover.

The finger $c$ has an upward extension at its outer end, and the bar $f$ when the lever is turned upward rests on the finger between its upward extension and the side of the lever.

Having now particularly described and ascertained the nature of this invention and in what manner the same is to be performed, I declare that what I claim is—

1. The combination with a cover for culinary vessels and the like, of a bar with middle cranked portion having inclined sides, the said bar having hooked ends adapted to engage the rim of the vessel on which the cover is placed and a lever pivoted at its lower end to the upper side of the cover and having a handle at its upper end and a laterally-projecting finger adapted to engage either the cranked portion of the bar or the inclined side of the cranked portion of the bar, substantially as described.

2. The combination with a cover for culinary vessels and the like, of a bar $f$ with middle cranked portion having inclined sides, the said bar having hooked ends $h$, adapted to engage under a projecting rim of the vessel on which the cover is placed, an angle-piece $a$, secured to the cover, and a lever $b$, pivoted to the angle-piece and having a handle $d$ and a projecting finger $c$, the said finger being adapted to engage either the cranked portion of the bar or the inclined side of the cranked portion of the bar, for the purpose set forth.

3. The combination with a cover, of a lever mounted to swing thereon, a finger projecting laterally from the lever, and a bar arranged to engage the article on which the cover is placed, the said bar being provided with a middle cranked portion having inclined sides, the laterally-projecting finger of the lever being adapted to engage either the cranked portion of the bar or the inclined side of the cranked portion, substantially as described.

In witness whereof I have hereunto signed my name in the presence of two subscribing witnesses.

JOHANN WEIDNER.

Witnesses:
 JOHANN LIPPOLD,
 OSCAR BOCK.